Figure 1:
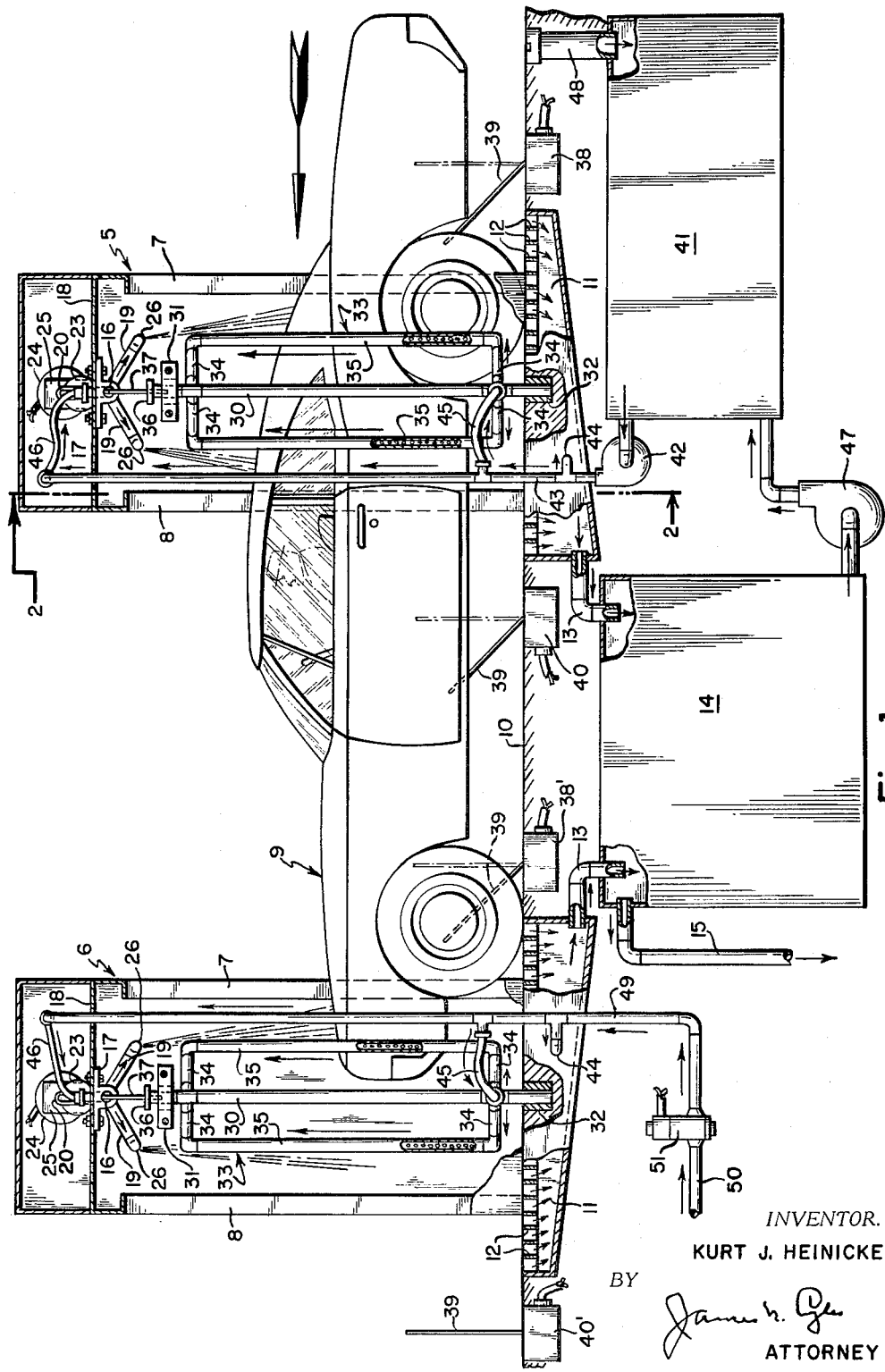

July 5, 1966 K. J. HEINICKE 3,259,138
WASHING APPARATUS FOR MOTOR VEHICLES
Filed Oct. 29, 1964 2 Sheets-Sheet 1

INVENTOR.
KURT J. HEINICKE
BY
ATTORNEY

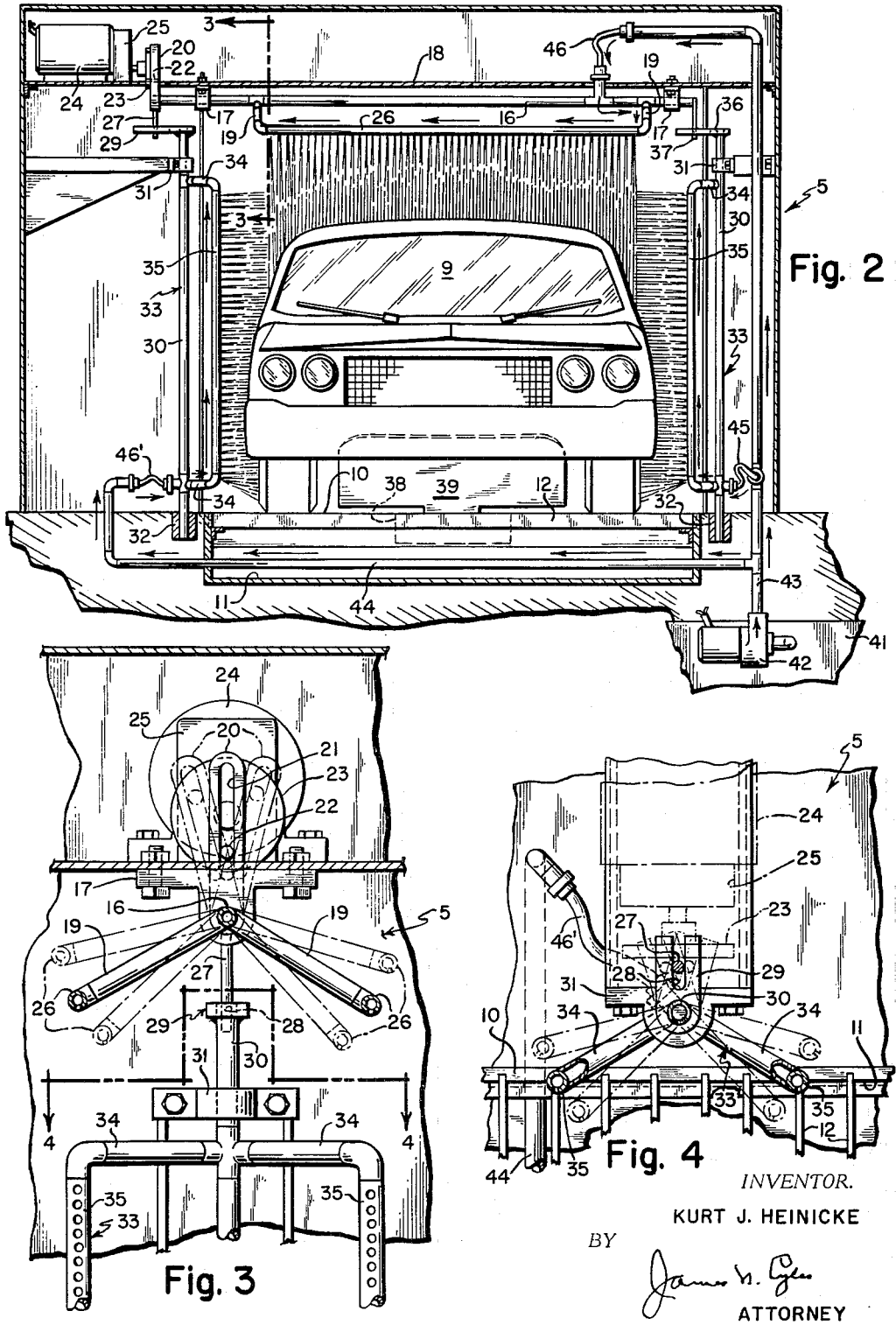

United States Patent Office 3,259,138
Patented July 5, 1966

3,259,138
WASHING APPARATUS FOR MOTOR VEHICLES
Kurt J. Heinicke, Hollywood, Fla., assignor to Heinicke Instruments Co., Hollywood, Fla., a corporation of Florida
Filed Oct. 29, 1964, Ser. No. 407,304
3 Claims. (Cl. 134—45)

This invention relates to a washing apparatus for motor vehicles and to effectively wash and rinse the exterior of the vehicle during the transverse of the vehicle through the system.

Car washing apparatus is well known basically but in existing car wash systems, the vehicle is pulled through the washing apparatus by chains or other conveying mechanism and also requiring brushes for scrubbing the sides and top of the vehicle and necessitating the employment of several persons with mittens to clean areas that the brushes do not reach and a separate wheel washing equipment is provided that is also provided with brushes and that scrubs the side walls of the tires as the vehicle passes through the system, necessitating expensive labor costs.

The device of the present invention embodies a generally U-shaped housing open at its front and rear for the passage of the vehicle and with the housing supporting an upper horizontally arranged oscillatory washer head and vertically disposed washer heads adjacent each end of the housing whereby the entire exterior of the vehicle is thoroughly cleaned with a detergent and a second housing, substantially identical to the first housing is employed to spray a rinsing fluid upon the body of the vehicle as it passes therethrough or, the vehicle could be rinsed in any other desirable manner.

It is contemplated that the vehicle may pass through the housing or housings under its own power and driven by the owner or an attendant so that the vehicle has a continuous motion and with trip switches actuated by the undercarriage of the vehicle to first activate the washing apparatus and to continue the activation of the washing apparatus until the vehicle has entirely passed through the housing and a similar method may be employed by a continuous movement of the vehicle through a rinse station where rinse water is sprayed upon the body of the vehicle and the tires to effectively remove the detergent from the body.

The invention further contemplates a drainage sump for the fluid, both detergent and rinse and with the fluid being first conducted to the spray heads by pressure actuated pump to spray the detergent upon the body of the vehicle and the tires and subsequently drained to a filtering tank that is provided with suitable heating elements to maintain the detergent at a predetermined temperature. Further, the invention comprises a housing open at front and rear for the passage of a vehicle and with an upper horizontally arranged spray head of V-shape being oscillatory by a drive motor and with the spray head having perforated arms spraying a detergent and/or a rinse upon the body of the vehicle and with side V-shaped spray heads at each side of the vehicle that are oscillated under the influence of the oscillation of the upper spray head so that the spray heads thoroughly wash the sides and the tires of the vehicle in an effective manner and with upstanding switch plates projecting into the path of movement of the vehicle for energizing the spray heads during the movement of the vehicle through the housing and, after the vehicle has moved through the housing, the plates are biased upwardly to interrupt the flow of current to the several motors that control the flow of the cleaning and rinsing mediums to the vehicle.

Novel features of construction and operation of the device will be more clearly apparent during the course of the following description, reference being had to the accompanying drawings wherein has been illustrated the preferred form of the device and wherein like characters of reference are employed to denote like parts throughout the several figures.

In the drawings:
FIGURE 1 is a longitudinal section through a device constructed in accordance with the invention and with parts shown in elevation and parts in section,
FIGURE 2 is a longitudinal section taken substantially on line 2—2 of FIGURE 1,
FIGURE 3 is an enlarged transverse section taken substantially on line 3—3 of FIGURE 2, and
FIGURE 4 is a horizontal section taken substantially on line 4—4 of FIGURE 3.

In the drawings, having particular reference to FIGURE 1, there has been provided a pair of U-shaped upstanding housings 5 and 6, open at their opposite ends as indicated at 7 and 8, constituting passageways for a vehicle shown at 9. A runway or floor 10, which may of course be ramps extend through the housings and to have guiding movement for the vehicle 9. Between each ramp, there has been provided sumps 11, having a grated cover 12, for the free passage of fluid employed in the washing and rinsing operation and these sumps are inclined upon their bottoms and connected with drain pipes 13 that drain into a filtering tank 14. The filter tank adjacent its upper end is provided with an overflow pipe 15. Since the housings 5 and 6 and associated mechanism is identical, the description of one will suffice for both.

Mounted within the housings 5 and 6 is a horizontally arranged pipe 16, journaled in bearings 17, fixed upon an upper partition 18. The pipe 16 is provided with laterals 19 that are angularly arranged and constituting a generally V-shaped spray head that is perforated at spaced apart points to spray either the detergent or the rinse over the body of the vehicle from the top and the pipe 16 is extended at one end for connection to an arm 20, that is slotted at 21 to receive an eccentric pin 22, carried by a disk 23 that is driven from an electric motor 24, through the medium of reduction gearing 25 and whereby the upper spray head, comprising the laterals 19, is caused to oscillate. The laterals 19 are connected to horizontal perforated tubes 26. The arm 21 is provided with a lower extension 27 that extends through a slot 28, in an arm 29, carried by a vertical tube 30, journaled in an upper bearing 31 and a lower bearing 32 and the tube 30 constitutes a part of a vertical spray head 33, having laterals 34 that are angularly arranged with respect to the tube 30 and with the laterals being connected to vertical perforated tubes 35 and whereby the oscillation of the upper spray head is transmitted to the side or vertical spray heads 33. The vertical spray heads 33 are substantially identical and the spray head 33 at the opposite side of the device is provided with a fixed arm 36, that is identical to the arm 29 and a finger 37, engages the slot in the arm 36 so that, when the upper spray head is oscillated, the oscillation will be transmitted to the spray heads 33.

Disposed within the path of movement of the vehicle 9, is a first feeler switch 38, having an upstanding abutment plate 39 that is of such length as to engage beneath the chassis of the vehicle and to be depressed, as indicated in FIGURE 1. The switch 39 actuates the motor 24 to oscillate the upper spray head and the side vertical spray heads and, as the vehicle continues through the housing 5, it is thoroughly washed by a detergent jet from the spray heads and continues until the vehicle has passed entirely through the wash housing 5 and a second feeler switch 40 has overriding engagement by the vehicle and maintains the energizing of the motor 24 until the vehicle has passed entirely through the housing 5 to be thoroughly washed by the detergent fluid. The rinse structure illustrated in FIGURE 1 and indicated at 6, is substantially identical to that previously described and the rinse housing 6 may be located at any desirable distance from the wash housing 5 and similar feeler switches 38 and 40, energize the motor 24 for a thorough rinsing of the detergent from the vehicle and the tires while the vehicle is passing therethrough, and it should be understood that the rinse mechanism within the housing 6 is disposed at a sufficient distance from the housing 5 to permit the vehicle to pass entirely through the housing 5 prior to its entry into the rinse housing 6.

The numeral 41 indicates a supply tank for the detergent fluid and this tank is connected adjacent its upper end to a pump 42, that forces the detergent through a vertically disposed conduit 43 at one end of the housing and the conduit 43 is also connected to a conduit 44, to the opposite side of the housing and the conduit 43 is connected to the vertical spray heads 33 by a flexible hose 45 and to the upper spray head by a flexible hose 46. The conduit 44 is connected to the opposite vertical spray head 33 by a flexible hose 46. Thus, when the pump 42 is energized, simultaneously with the motor 24, fluid will be forced from the tank 41 to the several spray heads and projected toward the body of the vehicle, its top and sides and also the side walls of the tires, oscillating back and forth during the movement of the vehicle through the housing until the mechanism is deenergized, after the vehicle is passed over the feeler switch 40. Fluid from the filtering tank, received from the sump 11, is thus re-circulated from the filtering tank 14 to the detergent tank 41 by a pump 47 and the re-circulation of the detergent results in a considerable saving in the operation of the device. The tank 41 may be provided with a filler spout 48, indicated in FIGURE 1.

As the vehicle leaves the wash housing 5 and has completely passed therethrough, it enters the rinse housing 6 where rinse water is forced through a vertical conduit 49 to the several spray heads and the rinse water is received from any suitable source of fluid supply through a pipe 50, controlled by a solenoid valve 51 that is also actuated by the feeler switches 38 and 40, effectively rinsing the detergent from the vehicle and, as the vehicle passes over the feeler switch 40, the system is deenergized and also deenergizing the pumps 42 and 47 and the valve 51.

In the use of the device, the vehicle enters through the housing 5 in the direction of the arrow shown in FIGURE 1, tripping the first feeler switch 38 and energizing the motor 24 and also the pump 42, oscillating the upper spray head and the side spray heads for directing detergent in a spray upon the sides and top of the vehicle. The simultaneous operation of the pump 42 may also activate the pump 47 for forcing a filtered and heated fluid from the tank 14 to the detergent tank 41. Since it is desired that the vehicle be continuously moving, an operator may drive the vehicle through the wash housing 5 at a relatively slow speed and the vehicle after being completely washed from front to rear, the switch 40 is permitted to rise to the dotted line position and to deactivate the several motors. Since it is necessary to remove the detergent from the body of the vehicle, the vehicle is continued forwardly to trip the second switch 38 and to energize the spray heads in the second housing 6 and to also energize the solenoid valve 51 where a fresh water rinse is pressurized from a service line 50 to extend upwardly through the conduit 49 and to the several spray heads, thoroughly rinsing the vehicle from end to end and, as the vehicle leaves the housing 6, it permits the switch 40 of the second or rinse unit to swing upwardly and deenergize the motor 24 and to close the solenoid valve 51. Drain water from both the washing and the rinsing falls within the sumps 11 and is drained into the tank 14, where it is heated and re-circulated to the detergent tank 41.

It will be apparent from the foregoing that a very simple mechanism has been employed to thoroughly wash the entire side and top areas of the vehicle and to also wash the wheels as the vehicle passes through the housing 5 and to then enter the rinse housing 6 where the detergent is thoroughly removed. It is contemplated that the conduits 43 and 44 and the conduit 49 be equipped with a high pressure pulsing device that is intermittent to force the sprays from the spray heads at a relatively high velocity in a push-pull action and this push-pull action effectively removes any deposits upon the vehicle and the tires that would ordinarily not be removed by a steady constant spray from the spray heads. The housing 5 and 6 may be relatively narrow from front to back with sufficient room for the installation of the spray heads and to project the sprays from the spray heads as the vehicle is moved therethrough.

It is to be understood that the invention is not limited to the precise construction shown, but that changes are contemplated as readily fall within the spirit of the invention as shall be determined by the scope of the subjoined claims.

I claim:

1. A cleaning apparatus for motor vehicles embodying a first washing station and a second rinsing station, the washing station being provided with an upper horizontally arranged spray head of V-shape, the spray head being carried by a tubular shaft that is journaled in a housing, a motor for driving the shaft and to oscillate the spray head, spray heads within the housing that are disposed upon opposite sides of the vehicle and with the spray heads being vertically arranged and journaled in brackets at their upper ends and bearings at the lower end that are rotatable in a flow area of the apparatus, the vertical spray heads being oscillatable by an extension upon the shaft of the upper spray head and whereby the motor drive for the upper spray head is transmitted to the vertical spray heads so that all of the spray heads will oscillate simultaneously for spraying a detergent upon the body of the vehicle and upon the wheels of the vehicle, a detergent containing tank having an outlet line, a pump connected to the outlet line and said pump being connected to pipes that extend upwardly through the housing and connected to the several spray heads by flexible piping, each of the spray heads being perforated to project a forceful spray of detergent fluid over the entire body of the vehicle and the wheels, a sump disposed upon a floor to collect drainage fluid from the spray heads, the sump being connected to a fluid supply tank and a pump operatively connecting the fluid supply tank to the detergent tank, a first feeler switch at the entrance side of the housing and a second feeler switch in the exit end of the housing, the feeler switches having upstanding plates that are normally biased to an upright position and with the plates being in the line of movement of the vehicle through the housing so that the plates are biased downwardly by engagement with the underneath portion of the vehicle to actuate the pump for the detergent throughout the movement of the vehicle and with the second switch having its plate biased downwardly by the vehicle so as to maintain the flow of detergent from the spray heads throughout the passage of the vehicle through the housing and with the first and second switches being biased upwardly after the vehicle has passed through the housing to de-energize the motor and the pump, the rinse station being substantially identical to the wash station and having the identical spray heads therein, first and second feeler switches for the rinse station whereby to energize the solenoid valve to permit the flow of rinse water upwardly to the several spray heads to rinse the detergent from the vehicle and with the second feeler switch of the rinse station biased upwardly after the vehicle has passed entirely through the rinse housing, to de-energize the motor for driving the spray heads and to de-energize the solenoid valve, the rinse housing also being provided with a sump for the drainage of rinse water to a fluid tank.

2. The structure according to claim 1 wherein the upper spray heads of each station is horizontally arranged and in upper spaced relation to a vehicle that is passing through the housings, the upper spray heads having a horizontal tubular shaft that is journaled in bearings carried by an upper partition of the housing, a motor mounted upon the upper side of the partition for driving the tubular shafts through a reduction gearing and whereby the upper spray heads are caused to oscillate, the tubular shafts adjacent each end being provided with laterals that are connected to perforated tubes constituting the spray head and with the laterals being angled downwardly to form substantially a V-shape spray head, each of the vertical spray heads having tubular shafts that are journaled in bearings at their upper and lower ends, the last named shafts also being provided with angled laterals that are connected by perforated tubing and to constitute vertical spray heads of V-shape, the vertical spray heads at their upper ends being provided with slotted arms and with the slots of the arms being engaged by pins that extend downwardly from the shaft of the upper spray head and whereby oscillation of the upper spray heads are transmitted to the vertical spray heads in an oscillatory manner, piping from the pump being connected to the several shafts by flexible tubing and whereby to energize each of the spray heads for spraying jets of fluid upon the body of the vehicle and the wheels.

3. The structure according to claim 1 wherein the tubular shafts of the upper spray heads adjacent to the drive from the motor is provided with an upstanding slotted rocker arm and a pin from the reduction gearing of the motor engaging the slot of the arm to oscillate the heads.

References Cited by the Examiner
UNITED STATES PATENTS 3,009,469 11/1961 Cunningham _____ 134—123
3,190,297 6/1965 Austin et al. _____ 134—123

CHARLES A. WILLMUTH, *Primary Examiner.*